United States Patent
Iino et al.

(10) Patent No.: US 6,979,935 B2
(45) Date of Patent: Dec. 27, 2005

(54) PIEZOELECTRIC MOTOR AND ELECTRONIC EQUIPMENT WITH PIEZOELECTRIC MOTOR

(75) Inventors: Akihiro Iino, Chiba (JP); Haruhiko Hasegawa, Chiba (JP)

(73) Assignee: Seiko Instruments Inc., Chiba (JP)

( * ) Notice: Subject to any disclaimer, the term of this patent is extended or adjusted under 35 U.S.C. 154(b) by 52 days.

(21) Appl. No.: 10/616,385

(22) Filed: Jul. 9, 2003

(65) Prior Publication Data

US 2004/0056564 A1  Mar. 25, 2004

(30) Foreign Application Priority Data

Jul. 12, 2002 (JP) .............................. 2002-204029
Jun. 3, 2003 (JP) .............................. 2003-157635

(51) Int. Cl.[7] ............................................. H02N 2/00
(52) U.S. Cl. ..................... 310/323.09; 310/323.04; 310/323.05; 310/323.08; 310/323.17; 310/328
(58) Field of Search ................... 310/313.01–323.05, 310/323.08, 323.09, 323.17, 323.18, 328, 310/32

(56) References Cited

U.S. PATENT DOCUMENTS

| | | | | |
|---|---|---|---|---|
| 4,019,073 A | * | 4/1977 | Vishnevsky et al. | 310/322 |
| 5,039,899 A | * | 8/1991 | Yamaguchi | 310/323.16 |
| 5,101,132 A | * | 3/1992 | Yamaguchi | 310/323.16 |
| 5,416,375 A | * | 5/1995 | Funakubo et al. | 310/323.16 |
| 5,852,336 A | * | 12/1998 | Takagi | 310/323.01 |
| 6,091,179 A | * | 7/2000 | Tobe et al. | 310/328 |
| 6,104,123 A | * | 8/2000 | Okazaki et al. | 310/323.09 |
| 6,218,769 B1 | * | 4/2001 | Iino et al. | 310/328 |
| 6,242,846 B1 | * | 6/2001 | Ashizawa et al. | 310/323.02 |
| 6,252,333 B1 | * | 6/2001 | Iino et al. | 310/323.17 |
| 6,570,296 B1 | * | 5/2003 | Iino et al. | 310/323.03 |
| 6,617,759 B1 | * | 9/2003 | Zumeris et al. | 310/323.17 |

* cited by examiner

Primary Examiner—Thomas M. Dougherty

(74) Attorney, Agent, or Firm—Adams & Wilks

(57) ABSTRACT

A piezoelectric motor has a vibrating body for undergoing vibrational movement in accordance with a vibration wave, a contact member disposed in contact with and driven by the vibrating body during vibration thereof, and a support member for supporting the vibrating body in the vicinity of a vibration node of the vibration wave. A pressurization member applies pressure to the support member along a pressurization axis to maintain the vibrating body in pressure contact with the contact member so that during vibration of the vibrating body, the support member regulates movement of the vibrating body in a direction of rotation about the pressurization axis.

22 Claims, 13 Drawing Sheets

FIG. 2A
FIG. 2B
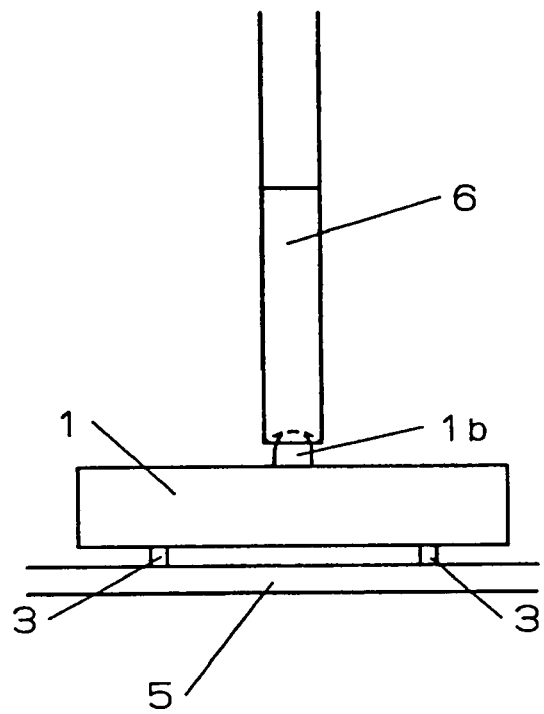
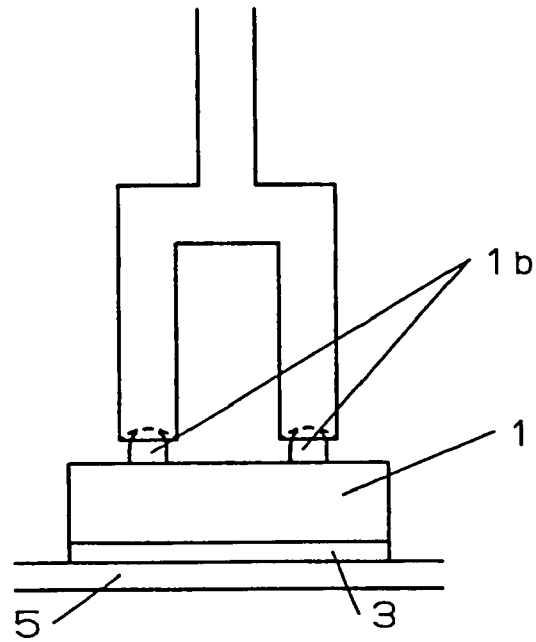

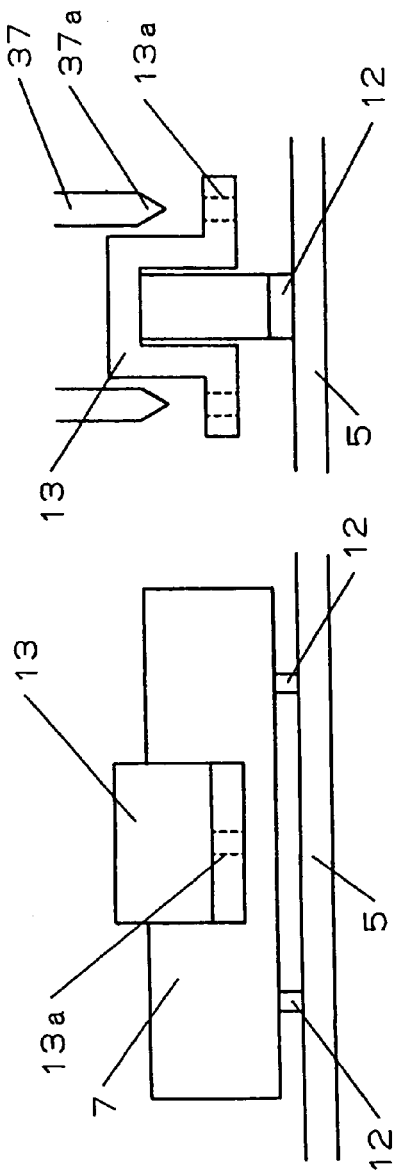
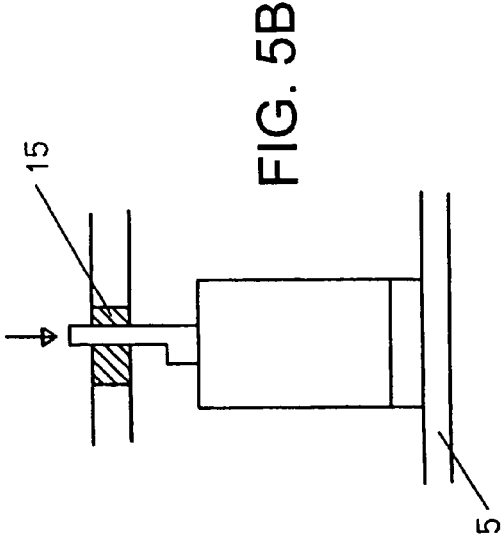
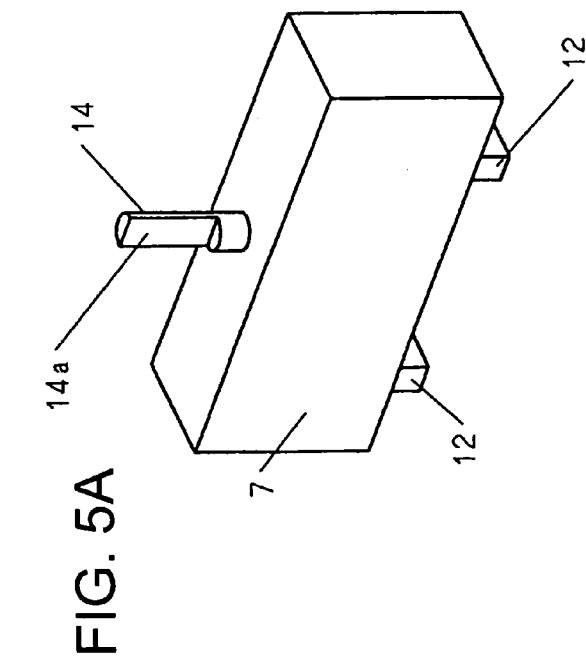

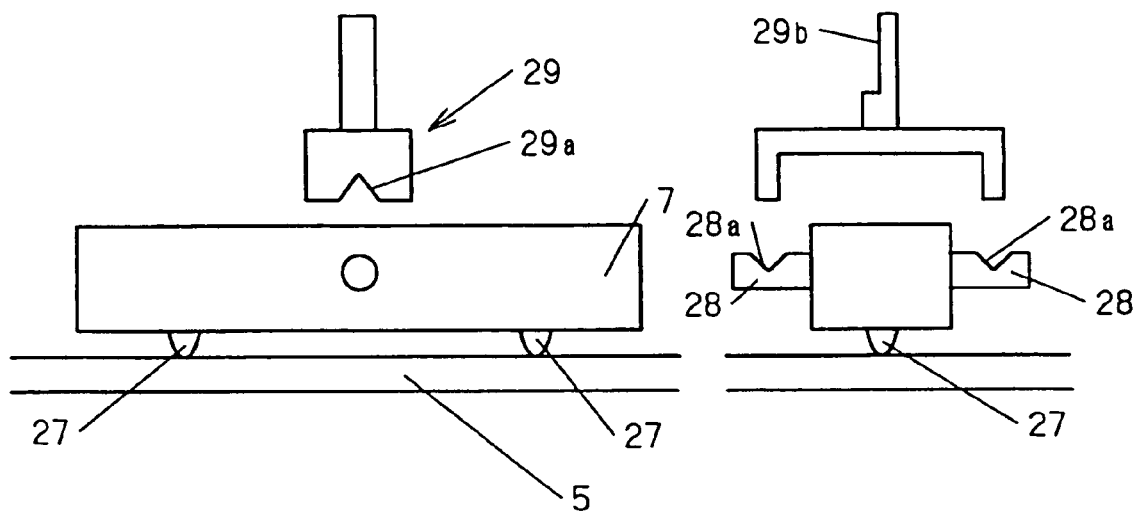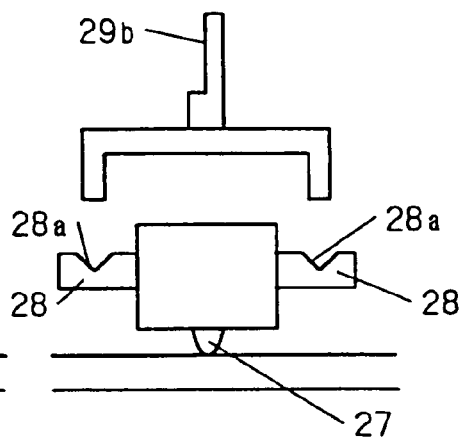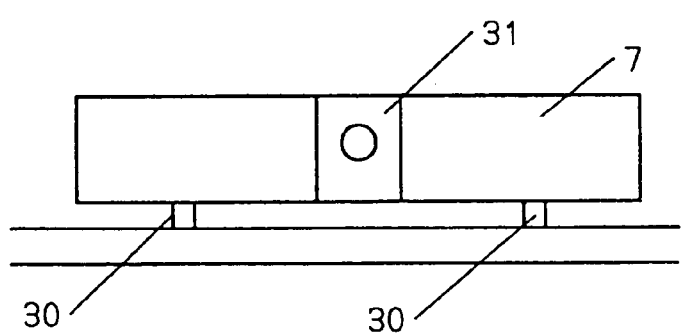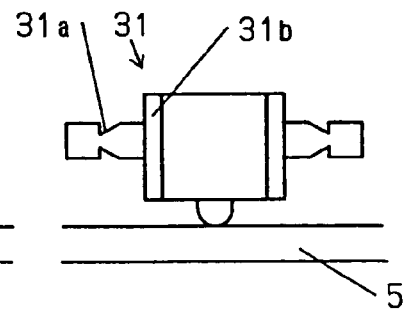

PIEZOELECTRIC MOTOR AND ELECTRONIC EQUIPMENT WITH PIEZOELECTRIC MOTOR

BACKGROUND OF THE INVENTION

1. Field of the Invention

The present invention relates to a piezoelectric motor, a stage equipped with the piezoelectric motor, and an electronic apparatus equipped with the piezoelectric motor.

2. Description of the Related Art

In recent years, as means for achieving ultraprecise positioning, attention has been given in various fields to the piezoelectric motor, also called an ultrasonic motor, for friction-driving a movable body contacting with a vibrating body having a piezoelectric element by vibration of the vibrating body. Especially, piezoelectric motor utilizing as a vibrating body a rectangular plate is widely used in various fields as a linear motor.

As a method of supporting the vibrating body in the form of a rectangular plate, as shown in FIG. 15, there is known a structure in which surroundings of rectangular plate vibrating bodies 100 comprising the piezoelectric elements are supported so as to be interposed by an elastic member 101 (for example, Patent Document 1).

[Patent Document 1]
Japanese Patent No. 2980541 Gazette (10–11 pages, FIG. 11)

However, in case where there is adopted the structure in which the vibrating bodies are supported by being interposed by means of the elastic member, there is such a case that the elastic member itself is deformed after positioning has been finished, so that a position of operation portion deviates. Further, also at a starting or stopping time, a support member is deformed by a reaction force, and a hysteresis in driving characteristic (moving quantity) has been liable to occur. Accordingly, as a result, the position of the movable body is liable to deviate, so that there has been a problem that it is difficult to realize the high precision positioning.

Further, there is an example in which vibrating bodies are supported by mutual engagement of members made of metal, for example, without using the elastic body, but also in this case there is a fear that the similar result is brought about in the engaging portion if there is a play.

Additionally, similarly to the support by the elastic body, if supporting conditions (constraint force, etc.) change, there has been a possibility that not only a dispersion in characteristic of an individual motor becomes large, but also the characteristic is greatly changed also by external environments (temperature, etc,).

SUMMARY OF THE INVENTION

Whereupon, a 1st mode of the invention exists in a piezoelectric motor operating, by vibration of a vibrating body having a piezoelectric element, a contact member or the vibrating body itself, having a support member which engages with the vibrating body in the vicinity of a position of node of vibration exited by the vibrating body, and which supports the vibrating body while regulating a motion of the vibrating body in a direction other than a contact direction between the vibrating body and the contact member, a contact member contacting with the vibrating body or a friction member provided in the vibrating body, and a pressurization means for pressurizing between the vibrating body and the contact member.

A 2nd mode of the invention exists, in the 1st mode, in a piezoelectric motor characterized by possessing plural concave portions provided in the vibrating body, and a support member having plural convex portions engaging with the concave portions.

A 3rd mode of the invention exists, in the 1st mode, in a piezoelectric motor characterized by possessing plural convex portions provided in the vibrating body, and a support member having plural concave portions engaging with the convex portions.

A 4th mode of the invention exists, in the 1st mode, in a piezoelectric motor characterized the friction member has a portion extended from the vibrating body.

A 5th mode of the invention exists, in the 1st mode, in a piezoelectric motor characterized it comprises a support member provided in the vibrating body and extending in a contact direction between the vibrating body and the contact member, and a guide member guiding the support member, and a motion in a direction other than a contact direction between a friction member provided in the vibrating body and the contact member is regulated by the support member and the guide member.

A 6th mode of the invention exists, in the 1st mode, in a piezoelectric motor characterized in that it comprises a support member provided in the vibrating body and extending in a contact direction between the vibrating body and the contact member, a guide member guiding the support member, and a spring member applying a contact pressure between the vibrating body and the contact member, the friction member provided in the vibrating body and the contact member are guided by the support member and the guide member so as to be movable in a contact direction, and a rotation of the vibrating body about the support member is constrained by the spring member and a spring guide portion engaging with the spring member.

A 7th mode of the invention exists, in the 1st mode, in a piezoelectric motor characterized in that it comprises a guide portion provided in the vibrating body, and a support member having an engagement portion engaging with the guide member, and a contact pressure between the vibrating body or a friction member provided in the vibrating body and the contact member is obtained by applying a pressurization force to the support member.

An 8th mode of the invention exists, in the 7th mode, in a piezoelectric motor characterized in that the guide portion is provided in the vicinity of a position of node of vibration of the vibrating body excited.

A 9th mode of the invention exists, in the 1st mode, in a piezoelectric motor characterized in that a contact pressure between the friction member and the contact member is obtained by pressurizing an extending portion provided in the vibrating body by means of the support member, the extending portion engages with the support member and performs a rotation with a center line of the extending portion being made a rotation center, and an engagement portion between the extending portion and the support member has a shape regulating an operation other than the rotation operation.

A 10th mode of the invention exists, in the 1st mode, in a piezoelectric motor characterized in that a pressurization applying a contact pressure between the friction member and the contact member acts on plural points in a width direction of the vibrating body, and a shape of the friction member is one at least having a curved line toward the width direction of the vibrating body.

An 11th mode of the invention exists, in the 1st mode, in a piezoelectric motor characterized in that it is the piezoelectric motor operating a movable body that is the contact member, the vibrating body is supported so as to be rotatable by a rotation shaft provided in the vibrating body, and a contact pressure is applied to the vibrating body and the movable body by a pressurization force from a spring member.

A 12th mode of the invention exists, in the 11th mode, in a piezoelectric motor characterized in that the pressurization force from the spring member acts to the vicinity of the position of node of vibration exited by the vibrating body.

A 13th mode of the invention exists, in the 11th mode, in a piezoelectric motor characterized in that the pressurization force from the spring member acts as a torque of the rotation shaft.

A 14th mode of the invention exists in an electronic equipment or apparatus having the piezoelectric motor according to any one of the modes 1–13, a transmission mechanism operating monolithically with a movable body, and an output mechanism operating on the basis of an operation of the transmission mechanism.

A 15th mode of the invention exists in a stage having the piezoelectric motor according to any one of the modes 1–13, and possessing a piezoelectric motor having a transmission mechanism operating monolithically with a movable body, and an output mechanism operated on the basis of an operation of the transmission mechanism.

BRIEF DESCRIPTION OF THE DRAWINGS

FIGS. 2A–2B are views showing another example of the support structure of the piezoelectric motor according to the embodiment 1 of the invention;

FIGS. 4A–4B are views showing another example of the support structure of the piezoelectric motor according to the embodiment 1 of the invention;

FIGS. 5A–5B are views showing another support structure of the piezoelectric motor according to an embodiment 2 of the invention;

FIGS. 10A–10B are views showing a support structure of the piezoelectric motor according to an embodiment 4 of the invention;

FIGS. 11A–11B are views showing another example of the support member of the piezoelectric motor according to the embodiment 4 of the invention;

DETAILED DESCRIPTION OF THE PREFERRED EMBODIMENTS

Hereunder, embodiments in which the present invention has been applied are explained referring to FIGS. 1–14.

(Embodiment 1)

FIG. 1 shows a piezoelectric motor according to the embodiment 1 of the invention. Especially, FIG. 1C and FIG. 1D show a state of vibration amplitude, i.e., distribution of vibration, with respect to a longitudinal direction of a vibrating body 1.

Figure 1A:
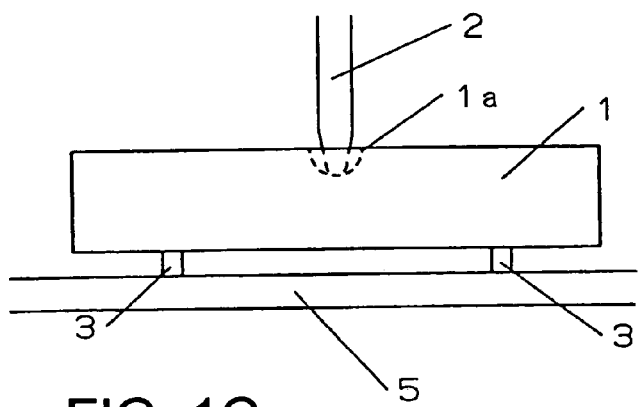
FIGS. 1A–1E are views showing a support structure of a piezoelectric motor according to an embodiment 1 of the present invention.
Figure 1B:
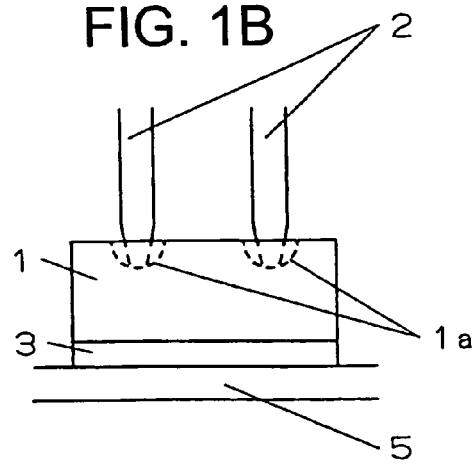
Figure 1C:
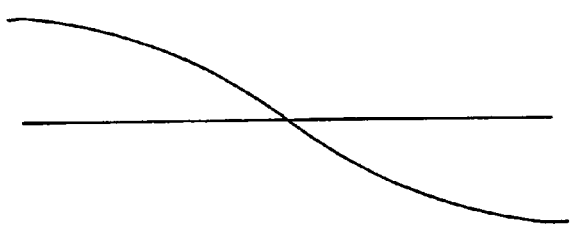
Figure 1D:
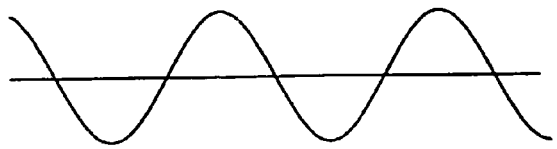

In FIG. 1A, the vibrating body 1 having a piezoelectric element performs a longitudinal vibration in which the amplitude becomes maximum in its both ends and it becomes a node of the vibration in its center portion as shown in FIG. 1C, and a bending vibration along a thickness of the vibrating body 1 as shown in FIG. 1D. If they are excited such that phases are different, at a point where the bending vibration becomes maximum, since a friction member 3 bonded to the vibrating body 1 for instance performs an elliptic motion, a contact member 5 or the vibrating body 1 itself, which contacts with the friction member 3, is moved in a vibrating body longitudinal direction. Here, as the vibrating body, there may be used one in which the piezoelectric element and an elastic body such as metal are bonded, or there may be used only the piezoelectric element, e.g., laminated piezoelectric element. Further, electrodes used are arbitrary as well.

Figure 1E:
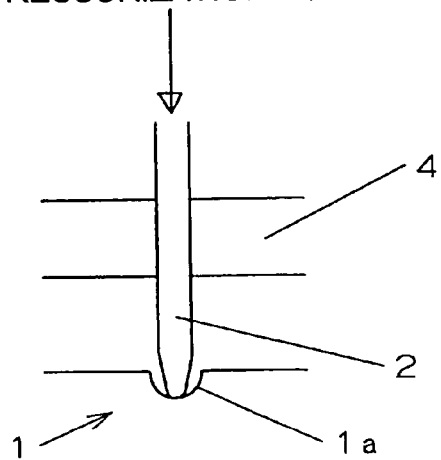

Here as shown in FIG. 1B, in an upper face of the vibrating body 1, two semispherical concave portions 1a are provided in the vicinities of points located in node portions of the vibration. From above of the vibrating body 1, there are provided pin-shaped support members 2 having at their tips two semi-spherical convex portions engaging with the concave portions 1a. As shown in FIG. 1E, the support member 2 is guided by a guide member 4, and becomes movable only in a contact pressure direction between the friction members 3 provided in the vibrating body 1 and the contact member 5. For example, by applying a pressurization to one end of the support member 2, a contact pressure acts between the friction member 3 and the contact member 5. On this occasion, the vibrating body 1 follows such that the contact between the friction member 3 and the contact member 5 becomes good, but a movement in other direction is regulated. Accordingly, there can be realized a piezoelectric motor which is high in its efficiency and excellent in its durability and whose positioning resolving power is high.

As the friction member 3 there are used, for example, an engineering plastic obtaining carbon fibers, a ceramics such as alumina and a hard metal such as stainless steel, and as the contact member there are used a hard metal such as stainless steel and ceramics such as alumina.

A modified example of the embodiment 1 is explained using FIG. 2A and FIG. 2B. Although as shown in FIGS. 2A and 2B, the vibrating body 1 is similar to one of FIG. 1, the vibrating body 1 is provided with two hemispherical convex portions 1b in place of the hemispherical concave portion. A support member 6 is made monolithic and bifurcated midway, and has two hemispherical concave portions provided at its tips and engaging with the convex portions 1b. According to his, similarly to the constitution of FIG. 1, a stable contact state is obtained between the vibrating body and the contact member, and the vibrating body is constrained in its movement in other directions.

FIG. 3 shows a piezoelectric motor according to another of embodiment 1. Especially, FIG. 3C and FIG. 3D show the state of vibration amplitude, i.e., distribution of amplitude, with respect to the longitudinal direction of a vibrating body 7.

Figure 3A:
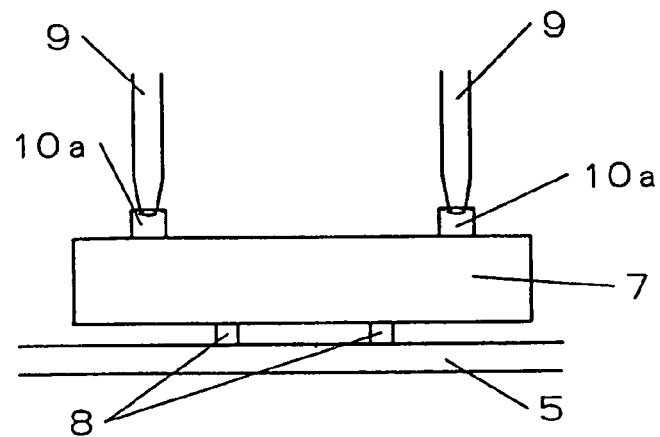
FIGS. 3A–3E are views showing another example of the support structure of the piezoelectric motor according to the embodiment 1 of the invention.
Figure 3B:
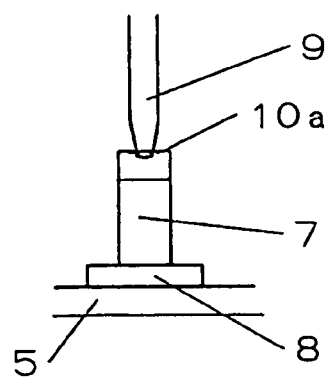
Figure 3C:
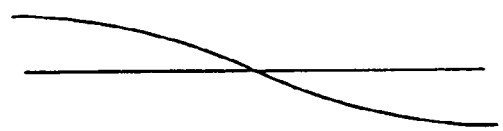
Figure 3D:
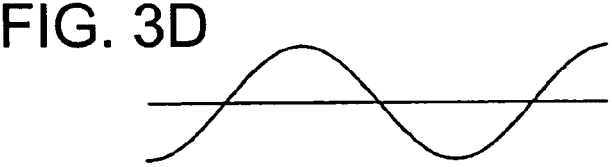

In FIG. 3A and FIG. 3B, the vibrating body 7 having a piezoelectric element performs a longitudinal vibration in which the amplitude becomes maximum in its both ends and it becomes a node of the vibration in its center portion as shown in FIG. 3C, and a bending vibration along a thickness of the vibrating body 7 as shown in FIG. 3D. If they are excited such that phases are different, at a point where the bending vibration becomes maximum, since a friction member 8 bonded to the vibrating body 7 for instance performs an elliptic motion, the contact member 5 or the vibrating body 7 itself, which contacts with the friction member 8, is moved in a vibrating body longitudinal direction. Here, as the vibrating body 7, there may be used one in which the piezoelectric element and an elastic body such as metal are bonded, or there may be used only the piezoelectric element, e.g., laminated piezoelectric element. Further, electrodes used are arbitrary as well.

Figure 3E:
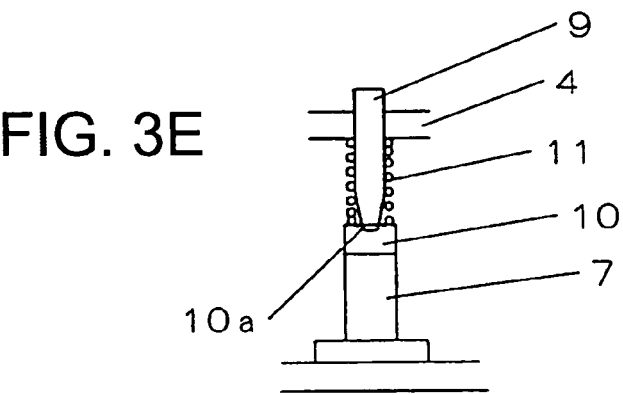

Here as shown in FIG. 3A, in the vicinity of a point located in the node of the bending vibration of the vibrating body, there provided receiving members 10 each having a semi-spherical concave portion 10a. From above of the vibrating body 7, there are provided pin-shaped support members 9 having at their tips two semi-spherical convex portions 9a engaging with the concave portions 10a. As shown in FIG. 3E, each of the support members 9 is guided by a guide member 4, and becomes movable only in a contact pressure direction between the vibrating body 7 or the friction members 8 provided in the vibrating body 7 and the contact member 5. In FIG. 3E, for example, by providing a spring member 11 between the guide member 4 and the receiving member 10, a contact pressure acts between the friction member 8 and a contact member 5. On this occasion, the vibrating body 7 follows such that the contact between the friction member 8 and the contact member 5 becomes good, but movement in other directions is regulated.

As mentioned above, by the fact that the convex portion or the concave portion is provided in the vicinity of the position of the node of the vibration where the vibrating body vibrates, the vibration of the vibrating body is not hindered. Further, by the fact that the portion extended from the vibrating body is possessed by making the friction member 8 long, the vibrating body can stably maintain its position by the simple support without coming down against a pressurization from the support member 9 even in case where a thickness of the vibrating body 7 is thin.

Next, other example of the embodiment 1 is explained using FIG. 4A and FIG. 4B. The vibrating body 7 in FIG. 4A is one similar to one of FIG. 3. Here, as shown in FIG. 4B, a support receiving member 13 having an extending portion is bonded along a side face in the vicinity of a center portion corresponding to the node of the vibration of the vibrating body 7. Although a gap is formed between the support receiving member 13 and the vibrating body 7, this is for the purpose of reducing a loss of the vibration of the vibrating body 7 as small as possible. Of course, the support receiving portion 13 may be bonded to a side face of the vibrating body 7. In this case, since a large rigidity of the support portion can be expected, a large pressurization force is applied to the vibrating body 7 and thus a large thrust is obtained and, since a stability at a starting or stopping time is increased, it is excellent in controllability. The support receiving member 13 may be made from metal and the like, but it consists of a material which hardly undergoes an influence of the vibration to the vibrating body 7 because it greatly differs in its elasticity and acoustic impedance from engineering plastic and the like. The extending portion of the support receiving portion 13 is provided with a through-hole 13a becoming the concave portion, engages with a support member 37 having at its tip a conical convex portion 37a as shown above, and is supported. The support member 37 is guided by a guide member (not shown), and becomes movable only in a contact pressure direction between the vibrating body 7 or a friction member 12 provided in the vibrating body 7 and the contact member 5. By this, in addition to the advantages mentioned hitherto, since a distance between the two engaging portions becoming support points can be widened and a position of the engaging portion can be lowered to a point adjoining the contact member 5, a stable support is possible even in case where a thickness of the vibrating body 7 is thin.

(Embodiment 2)

Embodiment 2 of the invention is described below on the basis of FIG. 5 and FIG. 6.

In FIG. 5 and FIG. 6, since the vibrating body 7 is one similar to FIG. 3, only different points are mentioned. In FIG. 5A and FIG. 5B, the vibrating body 7 comprises a support member 14 extending in a contact direction between the vibrating body 7 and the contact member 5, and a guide member 15 guiding the support member 14. The support member 14 is provided with a deformed portion 14a. Since the guide member 15 has a shape conforming to the deformed portion 14a, a motion in the direction other than the contact direction between the vibrating body 7 and the contact member 5 is regulated, so that a stiff and stable support is obtained by a simple structure. Accordingly, a motion of the vibrating body 7 at the starting/stopping time is suppressed, and the positioning control excellent in controllability and having a high precision becomes possible. Since the support member 14 is provided in the vicinity of the node of the vibration of the vibrating body, the vibration of the vibrating body 7 is not hindered.

Figure 6A:
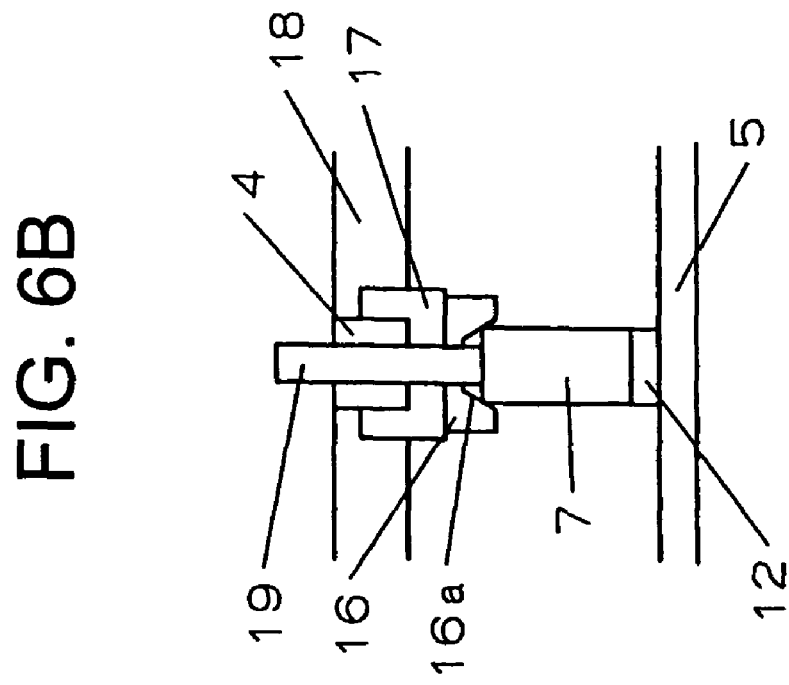
FIGS. 6A–6B are views showing another example of the support structure of the piezoelectric motor according to the embodiment 2 of the invention.
Figure 6B:
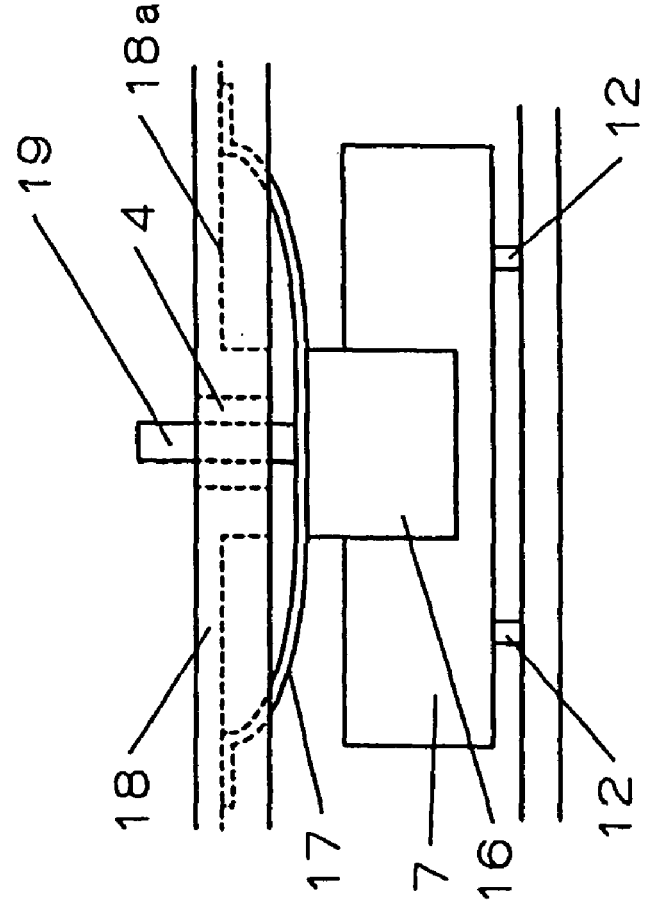

FIG. 6A and FIG. 6B show other example of the embodiment 2 of the invention. The vibrating body 7 comprises a support member 19 extending in a contact direction between the vibrating body 7 and the contact member 5, and it is adapted so as to regulate a movement other than a movement in the contact direction between the vibrating body 7 and the contact member 5 and a rotational motion whose rotation axis is made the support member 19. Between the vibrating body 7 and a fixation plate 18 fixing the guide member 4, there are provided a pressurization spring 17 as a spring member and a regulation member 16 connected to the pressurization spring 17. The regulation member 16 and the pressurization spring 17 are provided with holes through which the support member 19 passes. A motion, of the pressurization spring 17, other than the contact direction between the vibrating body 7 and the contact member 5 is regulated by a guide groove 18a. Since the regulation member 16 is provided with a V-groove 16a, it undergoes a force of the pressurization spring 17, so that a motion of the vibrating body 7 is also regulated. In this manner, a strong and stable support is obtained by a thin structure including a pressurization mechanism. Further, since the support member 19 and the regulation member 16 are provided in the vicinity of the node of the vibration of the vibrating body, the vibration of the vibrating body 7 is not hindered.

(Embodiment 3)

Figure 7A:
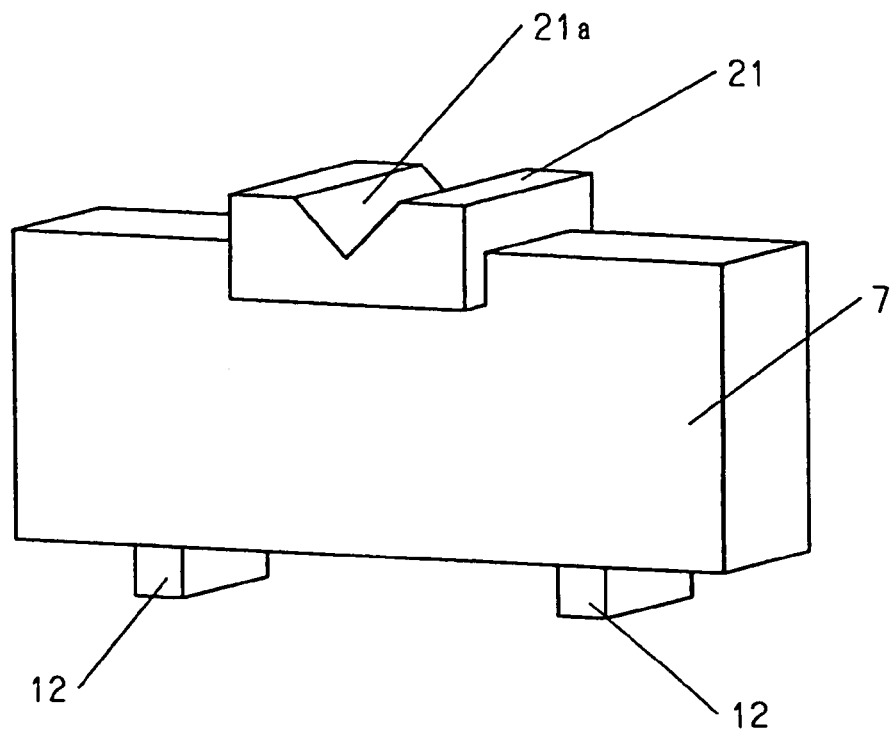
FIGS. 7A–7B are views showing a vibrating body peripheral portion of the piezoelectric motor according to an embodiment 3 of the invention.

Embodiment 3 of the invention is described below by using FIG. 7, FIG. 8 and FIG. 9. The vibrating bodies 7 and 20 are ones similar to one shown in FIG. 3. In FIG. 7A, a receiving member 21 having a V-groove 21a is bonded in the vicinity of a position corresponding to the node of the vibration. For the receiving member 21, a metal and the like may be used, but it is preferable to use, for example, an engineering plastic which differs greatly in acoustic impedance, elastic modulus and the like from the vibrating body 7. As shown in FIG. 8, a support member 22 engages with V-groove 21a of the receiving member 21. The support member 22 is provided with a deformed portion 22b, is guided by a guide member (not shown), and it is adapted such that the vibrating body 7 is supported and the pressurization force is applied similarly to the embodiment 1. Further, since the support member 22 is engaged with the V-groove 21a of the receiving member 21, it is stably supported without play. A motion of the vibrating body 7 in a width direction is obtained by a friction force between the support member 22 and the receiving member 21, but a stopper 22a is provided for caution's sake. Further, it is preferable to perform a selection of a material, etc. such that friction force between the support member 22 and the receiving member 21 becomes larger than a friction force between the friction member 12 and the contact member 5. As a shape of the support member, there are considered one having a V-groove 24a in a support member 24 like FIG. 8C, one provided like FIG. 8B with a columnar stopper 23a in place of the stopper 22a in FIG. 8A, or a combination of these, and the like. However, like FIG. 8B, in case where the support member 23 is used, it is necessary to bore in the receiving member 21 a hole in which the stopper 23a is accommodated. Further, a support member 23 is provided with a deformed portion 23b, is guided by a guide member (not pressurization force similarly to the embodiment 1. Similarly, the support member 24 is provided with a deformed portion 24b, is guided by a guide member (not shown), it supports the vibrating body 7 and applies the pressurization force similarly to the embodiment 1.

Figure 7B:
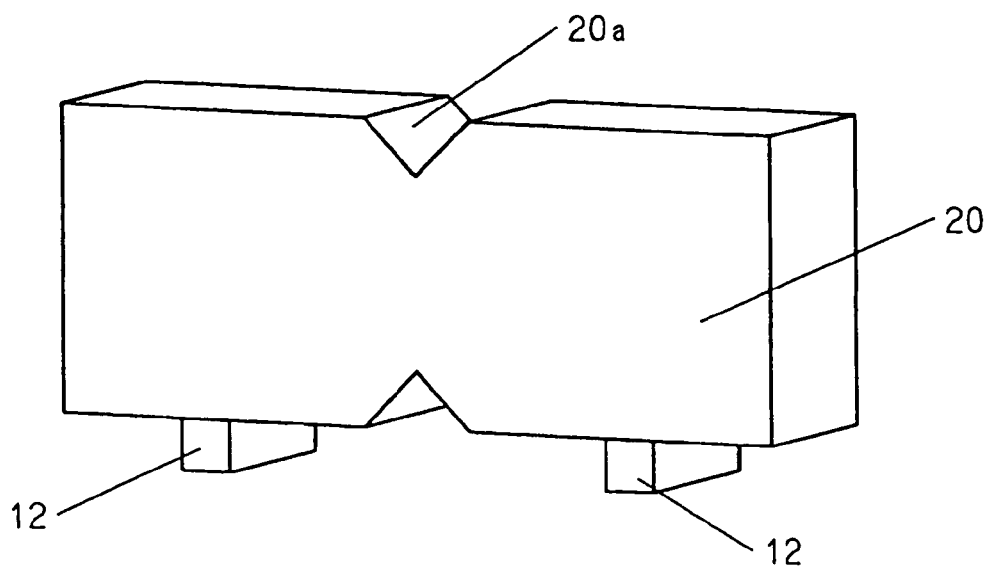
Figure 8A:
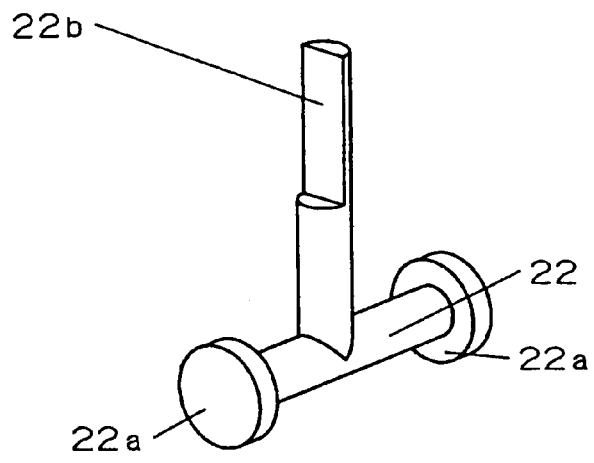
FIGS. 8A–8C are views showing an example of the support member of the piezoelectric motor according to the embodiment 3 of the invention.
Figure 8B:
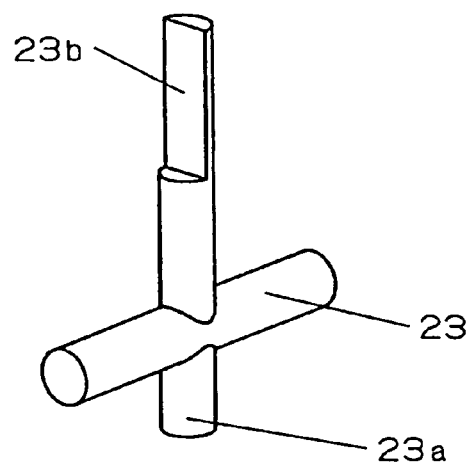
Figure 8C:
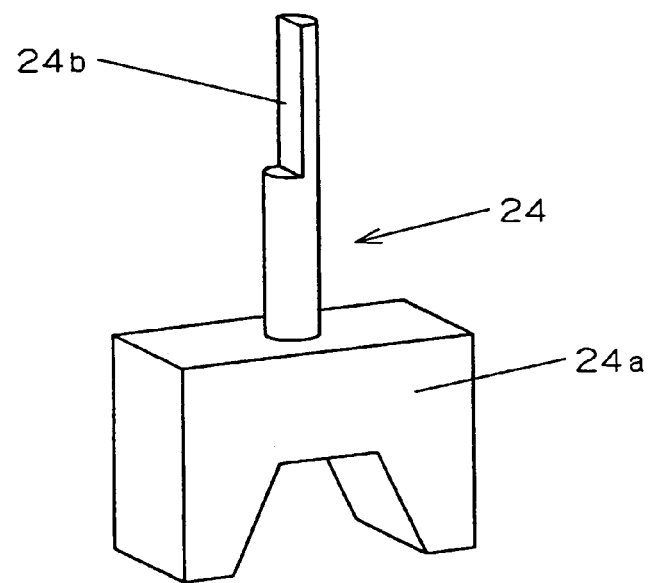

The receiving member 21 is bonded to the vibrating body 7 in FIG. 7A, but a receiving portion 20a may be directly provided in the vibrating body 20 as shown in FIG. 7B. It is preferable that the receiving portion 20a and the receiving member 21 are provided symmetrically to the vibrating bodies 7, 20 in this manner. By adopting such a structure, the vibrations generated in the vibration bodies 7, 20 also become symmetrical shapes, so that unnecessary vibration is difficult to occur.

Figure 9:
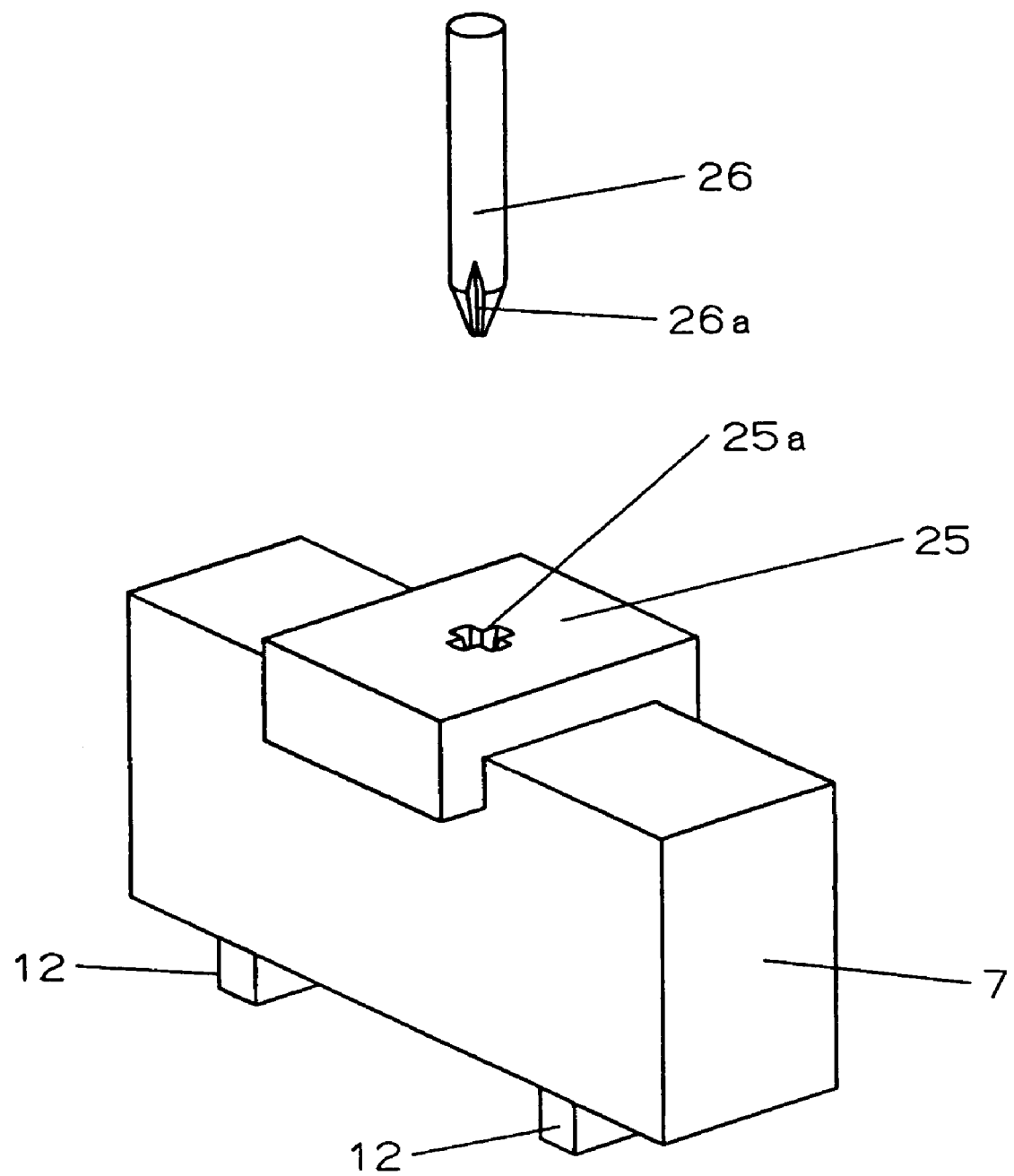
FIG. 9 is a view showing another example of a support structure of the piezoelectric motor according to the embodiment 3 of the invention.

Further, as a shape of the support member, a support member 26 having a convex portion 26a is made a + driver shape as shown in FIG. 9, and a shape of a receiving portion 25a in a receiving member 25 may be made a groove engaging with the + driver shape.

By adopting the above structure, since a loss of the vibration is small and a stable support is possible, a piezoelectric motor having a high efficiency and excellent in positioning resolving power can be realized.

(Embodiment 4)

The embodiment 4 is explained on the basis of FIG. 10 and FIG. 11.

The vibrating body 7 is similar to one shown in FIG. 3. In FIG. 10, an extended portion 28 is provided in the vicinity of a side face center portion of the vibrating member 7, i.e., position corresponding to the node of the vibration. The extended portion 28 may be bonded to a side face of the vibrating body 7 by an adhesive and the like, or it may be provided by providing a hole penetrating through the vibrating body 7 and connected by a screw and the like. As shown in the embodiment 1, above the vibrating body 7, a support member 29 is provided with a deformed portion 29b and a guide member (not shown) guiding the deformed portion 29b. A tip (vibrating body 7 side) of the support member 29 is bifurcated, and has a V-groove 29a. Also in the extended portion 28 there is provided a V-groove 28a in a peripheral direction, and it is adapted so as to engage with the V-groove 29a of the support member without a play. By making a shape of the friction member 27 into a semispherical form, a dimensional displacement between the two V-grooves 29a and the extended portion 28 is absorbed, so that a stable contact state is obtained between the vibrating body 7 and the contact portion 5.

As a structure of the extended portion, a pin 31a may be monolithically provided in a band-like shape 31b as shown in FIG. 11. In this case, a bonding strength between the extended portion 31 and the vibrating body 7 becomes large. Further, in this case, since the extended portion 31 is bonded over the whole width direction of the vibrating body 7, the vibration of the vibrating body 7 is not affected even if a position of the pin 31a is not agreed with a center, and a stable support becomes possible by lowering the position of the pin 31a to the contact member 5 side. Further, here, the similar advantage is obtained by making a friction member 30 into a half-cylindrical shape.

In this manner, if there is adopted a structure in which a pressurization or support force applying a contact pressure between the friction member and the contact member acts on plural points in a width direction of the vibrating body by making a shape of the friction member into one having a curved line at least toward the width direction of the vibrating body, no limitation is given to the structure, mainly one shown in FIG. 4, so that there is solved an instability of contact between the friction member and the contact member, which is generated by a dispersion of the pressurization in plural points, a dispersion of dimension of the support member, and the like.

Further, if the friction member is made into the hemispherical shape, besides these advantages, also an influence of dimensional variation, etc. generated in a bonded portion between the friction member and the vibrating body can be nullified. And, in this case, the advantage is obtained not by the support and the pressurization structure.

By the way, as materials for the extended portions 28 and 31, it is preferable to use engineering plastic, etc. for instance, which are greatly different in acoustic impedance, elastic modulus and the like from the vibrating body 7. In this case, there are advantages that not only the vibration of the vibrating body 7 is not damaged, but also a vibration mode shape is difficult to be influenced, and it is difficult to generate an energy loss by the support and a dispersion of individual product.

However, in this manner, if the extended portion 31 is one having a portion bonded to the vibrating body 31, e.g., the band-like shape portion 31b, there may be used a metal having high thermal conductivity, e.g., copper alloy, aluminum alloy, and the like. In this case, since it is possible to radiate the heat generated in the vibrating body 7, it is possible to apply a large input, so that a high output piezoelectric motor can be realized. Especially, in this embodiment, since it is provided in the vicinity of the node where the generation of heat is large, an efficiency of heat radiation is good. Especially, if the pin 31a is provided in the center of the vibrating body 7, it becomes effective because fears of the loss of vibration and the change in the vibration mode shape owing to the fact that the extended portion has been attached are small.

(Embodiment 5)

The embodiment 5 of the invention is explained using FIG. 12 and FIG. 13. This is an example in which the piezoelectric motor of the invention is applied to a drive of a head of a hard disc.

Figure 12A:
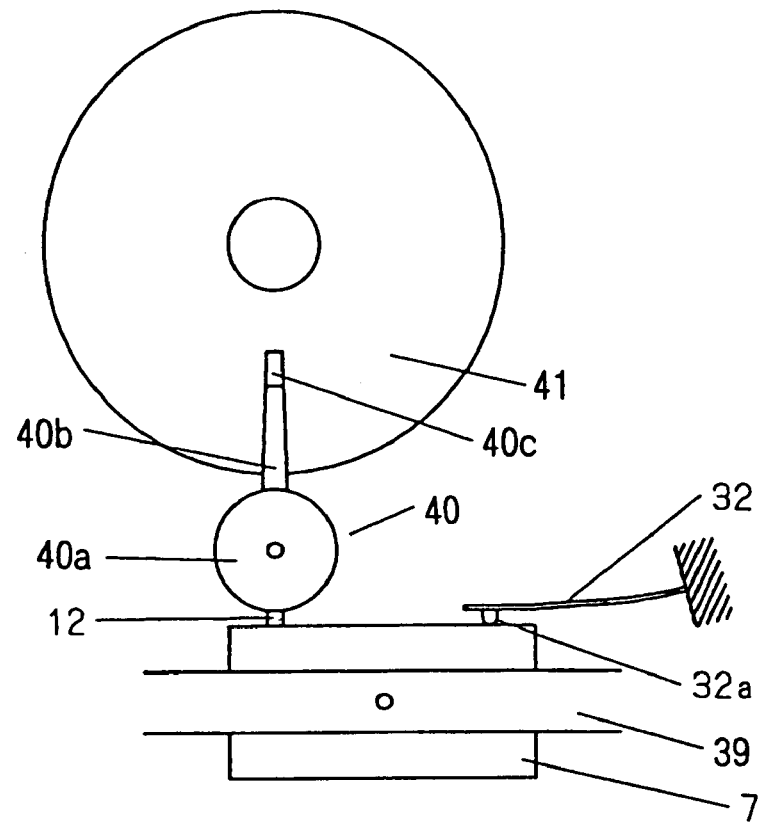
FIGS. 12A–12B are views showing the support member of the piezoelectric motor according to an embodiment 5 of the invention and an example of application to an electronic equipment.
Figure 12B:
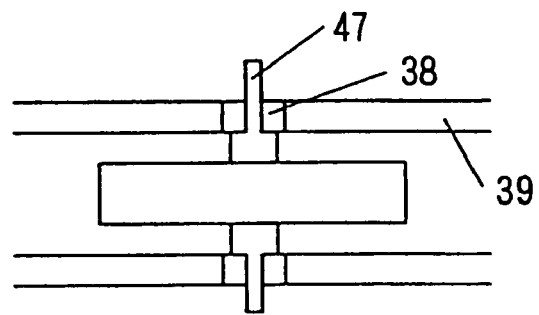

In FIG. 12A, a rotation shaft 47 is provided in a center of the vibrating body 7, i.e., in the vicinity of a position becoming the node of vibration. In FIG. 12B, the rotation shaft 47 is guided by a bearing 38 fixed to a presser plate 39. The rotation shaft 47 is drive-fixed to an inner ring of the bearing 38, and no play occurs in the rotation shaft 47 because a pre-load is applied to the bearing by a pre-load spring (not shown). The friction member 12 provided in the vibrating body 12 and a movable body 40a to which an arm 40b having a head 40c are pressurized by a pressurization spring 32 of a spring material in the vicinity of a node position of the vibration of the vibrating body 7, and a tip 32a of the spring is pressurization-contacted. An arm portion 40 comprising the movable body 40a, the arm 40b and the head 40 operates coinciding with a rotation of the movable body 40a, and the head 40c reads information of a disc 41. Since the piezoelectric motor of the invention is very high in its positioning resolving power and is excellent in its response characteristic, it can be applied to a future information storage device in which a high dencification of information is being proceeded, such as HDD and optical disc. Further, since no electric power is consumed at a stationary time, it is possible to aim at a power conservation of the equipment.

Figure 13A:
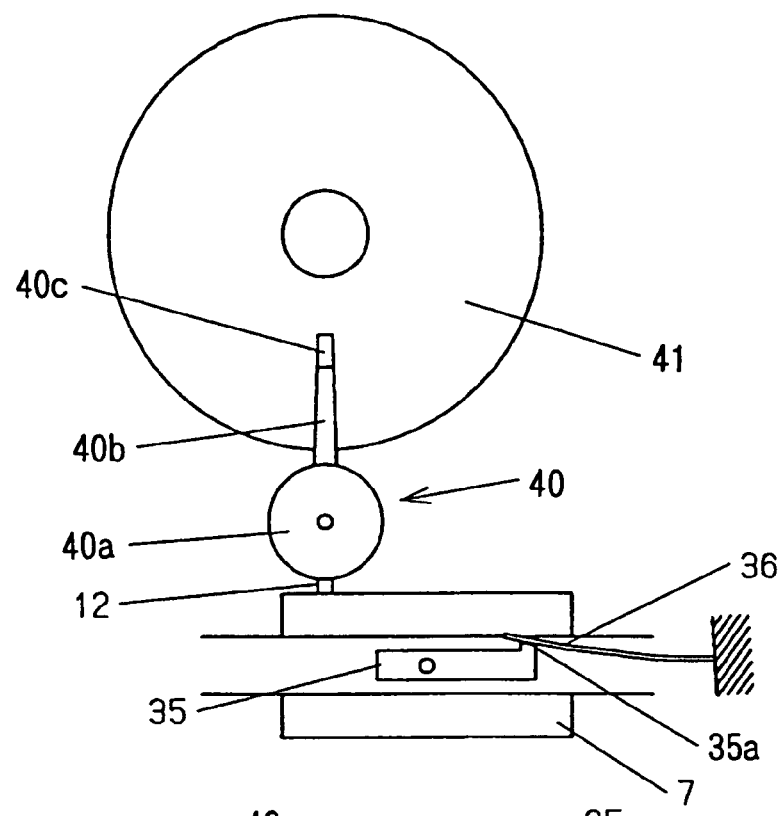
FIGS. 13A–13B are views showing the support member of the piezoelectric motor according to the embodiment 5 of the invention and other example of application to the electronic equipment.
Figure 13B:
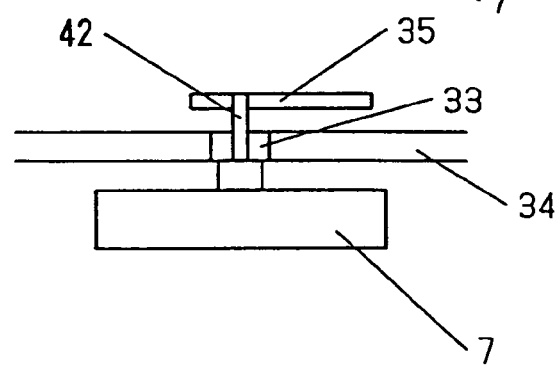

FIG. 13 is a modified example of FIG. 12. In FIG. 13A, a rotation shaft 42 is provided in a center of the vibrating body 7, i.e., in the vicinity of a position becoming the node of vibration. In FIG. 13B, the rotation shaft 42 is guided by a bearing 33 fixed to a presser plate 34. The rotation shaft 42 is drive-fixed to an inner ring of the bearing 33. Here, by adopting such a structure that the pressurization acts as a torque of the rotation shaft 42 by pressurizing a tip 35a of a pressurization receiving member 35 connected to the rotation shaft 42 by means of a spring member 36 instead of applying the pressurization to the vibrating body 7, since the pressurization does not act directly to the vibrating body 7, there is no loss of the vibration, the high efficiency is obtained, and the dispersion in characteristic of the individual motor becomes small.

In the above, although it has been shown about the embodiments 1–5, the shape of the vibrating body, the operation principle and the like are not limited by these embodiments, and the support structure concerned may be applied to a non-resonant ultrasonic motor for instance. Also in this case, it is desirable that the support position exists in a portion in which the displacement is small.

Further, as to the friction member, it may not exist, and the contact member and the vibrating body may be directly contacted.

(Embodiment 6)

Figure 14:
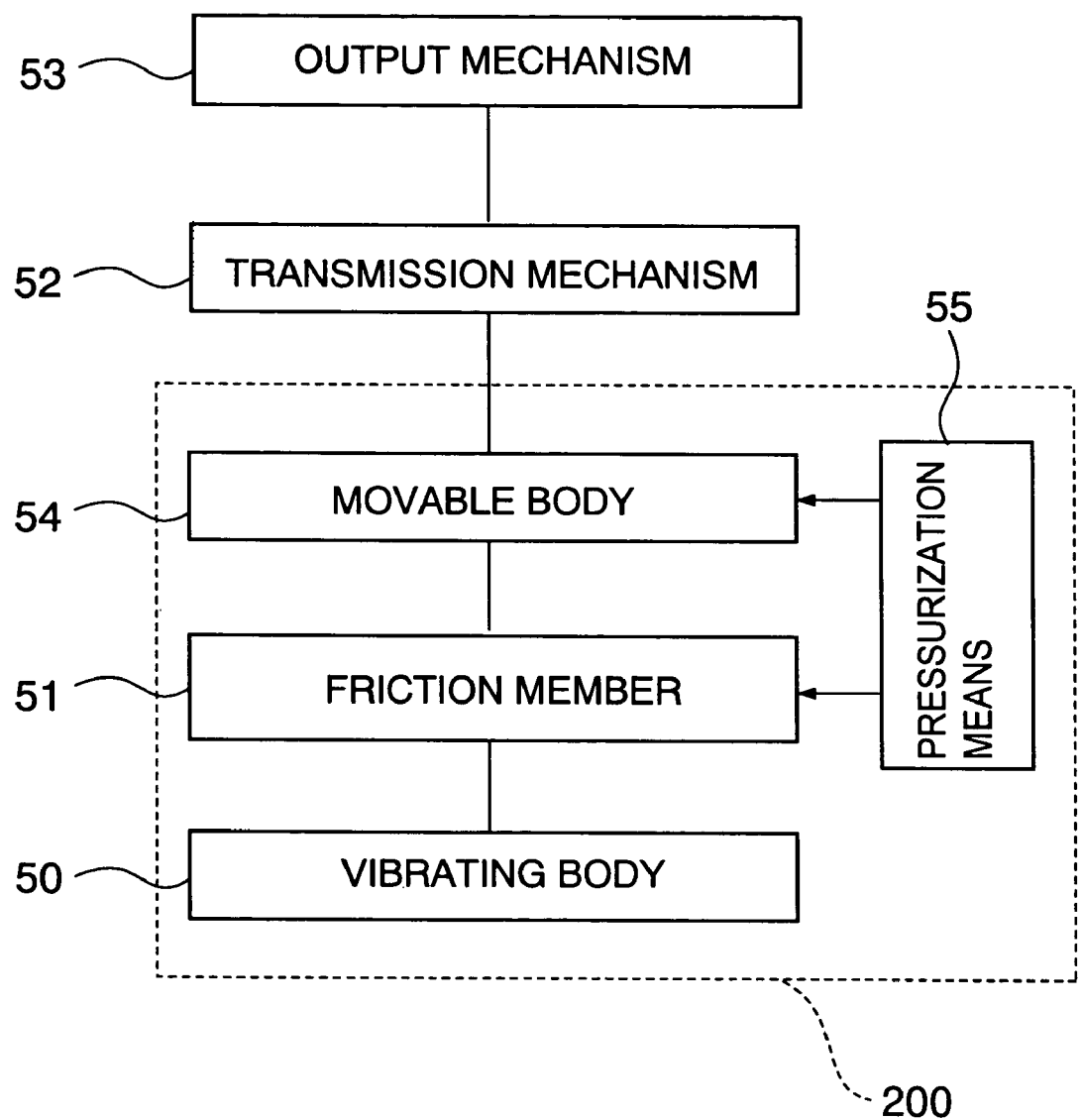
FIG. 14 is a block diagram showing an electronic equipment using the piezoelectric motor according to the invention.
Figure 15:
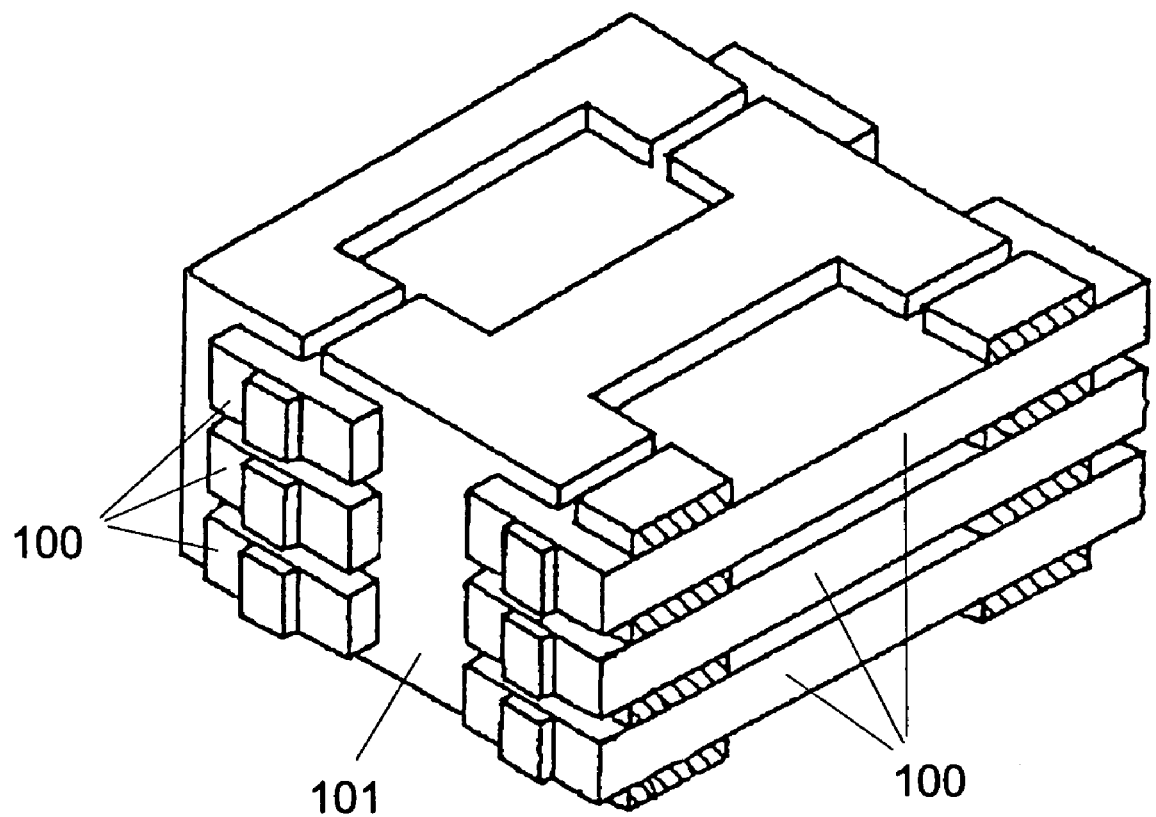
FIG. 15 is a view showing an example of a conventional support structure.

On the basis of FIG. 14, it is explained about an example in which an electronic equipment is constituted by using the piezoelectric motor according to the embodiments 1–5.

FIG. 14 shows a block diagram in case where a piezoelectric motor 200 driven by the invention is applied to a drive source of the electronic equipment. The electronic equipment is composed of the piezoelectric motor 200 comprising a vibrating body 50, a friction member 51 connected to the vibrating body 50, a pressurization means 55 for pressurizing the friction member 51 and a movable body 54, and the movable body 54 friction-driven under a state of being pressurized; a transmission mechanism 52 operating monolithically with the movable body 54; and an output mechanism 53 operated on the basis of an operation of the transmission mechanism 52.

Here, it is explained about an example in which the movable member is made a rotating body and the movable body is rotation-operated.

In the transmission mechanism 52, there are used, for example, gear trains and transmission wheels such as friction wheels. As the output mechanism 53, there are used a paper feed mechanism in printers, a shutter drive mechanism, a lens drive mechanism, film winding mechanism and the like in cameras, a pointer and the like in electronic equipments and measuring instruments, an arm mechanism in robots, and a gear tooth feed mechanism, workpiece feed mechanism and the like in machine tools.

Incidentally, as the electronic equipments in this embodiment, there are realized electronic timepieces, measuring instruments, cameras, printers, printing machines, robots, machine tools, game devices, optical information equipments, medical equipments, mobile equipments and the like. Additionally, if an output shaft is provided in the movable body and there is adopted a constitution having a power transmission mechanism for transmitting a torque from the output shaft, a piezoelectric motor drive apparatus can be realized. And, if a stage is constituted as the piezoelectric motor drive apparatus, it is possible to provide the stage having the piezoelectric motor whose mechanism is simple and small size and which can be used even under an environment avoiding a magnetization in comparison with a stage using a usual electromagnetic motor.

According to the invention, in a piezoelectric motor operating, by vibration of a vibrating body having a piezoelectric element, a contact member or the vibrating body itself, there are possessed plural concave portions provided in the vibrating body, and a support member having plural convex portions engaging with the concave portions. Further, there are possessed plural convex portions provided in the vibrating body, and a support member having plural concave portions engaging with the convex portions. According to this, a stable contact state is obtained between the vibrating body and the contact portion, and the vibrating body is restrained in its motion in other direction.

Further, by the fact that the convex portion or the concave portion is provided in the vicinity of the position of node of vibration excited by the vibrating body, the vibration of the vibrating body is not hindered.

Further, by the fact that the friction member provided in the vibrating body is caused to have the portion extending from the vibrating body, the vibrating body can stably maintain the position also against the pressurization from the support member without coming down.

Further, by adapting such that it comprises a support member provided in the vibrating body and extending in a contact direction between the vibrating body and the contact member, and a guide member guiding the support member, and a motion in a direction other than a contact direction between a friction member provided in the vibrating body and the contact member is regulated by the support member and the guide member, a simple and stable support is obtained.

Further, also by the facts that it comprises a support member provided in the vibrating body and extending in a contact direction between the vibrating body and the contact member, a guide member guiding the support member, and a spring member applying a contact pressure between the vibrating body and the contact member, the vibrating body and the contact member are guided by the support member and the guide member so as to be movable in a contact direction, and a rotation of the vibrating body about the support member is constrained by the spring member and a spring guide portion engaging with the spring member, the similar advantage is obtained.

Further, by the facts that it comprises a guide portion provided in the vibrating body, and one support member having an engagement portion engaging with the guide member, and a structure obtaining a contact pressure between the vibrating body and a friction member is made by applying a pressurization force to the support member, a stable contact state is obtained between the vibrating body and the contact portion and, since the vibrating body is restrained in its motion in other direction, a stable support having no play becomes possible.

Further, by the fact that the guide portion is provided in the vicinity of a position of node of vibration excited the vibrating body, a stable support becomes possible without hindering the vibration of the vibrating body.

Further, by the facts that a contact pressure between the friction member and the contact member is obtained by pressurizing an extending portion provided in the vibrating body by means of the support member, the extending portion engages with the support member and enables a rotation with a center line of the extending portion being made a rotation center, and shapes of the extending portion and the support member are determined such that an operation other than the rotation operation is regulated, a stable support having no play becomes possible.

Further, by making the friction member into a hemispherical or half-cylindrical shape, a dimensional difference of plural support portions is absorbed, and a stable contact state is obtained between the vibrating body and the contact portion.

Further, by the fact that there is adopted a structure in which the vibrating body is supported so as to be rotatable by a rotation shaft provided in the vibrating body, and a contact pressure is applied to the vibrating body and the movable body by a pressurization force from a spring member, a structure having no play in the support portion becomes possible.

Further, by adapting such that the pressurization force from the spring member acts to the vicinity of node of vibration exited by the vibrating body, a motor having high efficiency can be realized without hindering the vibration of the vibrating body.

Further, by adopting such a structure that the pressurization force from the spring member acts as a torque of the rotation shaft, there is no loss because no pressurization acts directly on the vibrating body, and an efficiency is high and a dispersion of individual motor becomes small.

Further, an electronic equipment with piezoelectric motor, in which there is mounted any one of the above piezoelectric motors, can drive a movable portion whose response is high and which has high positioning resolving power, and it is possible to realize an electronic equipment whose electric power consumption is low.

Further, a stage having any one of the above piezoelectric motors can provide a stage having a piezoelectric motor whose mechanism is simple and small, and which can be used even under an environment avoiding magnetization. By the above, according to the invention, since there is no mechanical play in the support portion or, even if the play exists, since it is maintained by a friction force between the vibrating body and the movable body, the stable positioning control which is high in precision becomes possible. And, since a vibration loss in the support portion is extremely small and a good contact is obtained between the vibrating body and the movable body, there is obtained a piezoelectric motor whose efficiency is high and whose life is long.

What is claimed is:

1. A piezoelectric motor comprising:
    a vibrating body for undergoing vibrational movement in accordance with a vibration wave;
    a contact member disposed in contact with and driven by the vibrating body during vibration thereof;
    a support member supporting the vibrating body in the vicinity of a vibration node of the vibration wave; and
    pressurization means for applying pressure to the support member along a pressurization axis to maintain the vibrating body in pressure contact with the contact member so that during vibration of the vibrating body, the support member regulates movement of the vibrating body in a direction of rotation about the pressurization axis.

2. A piezoelectric motor comprising:
    a vibrating body for undergoing vibrational movement in accordance with a vibration wave, the vibrating body having a plurality of concave portions;
    a contact member disposed in contact with and driven by the vibrating body during vibration thereof;
    a support member supporting the vibrating body in the vicinity of a vibration node of the vibration wave, the support member having a plurality of convex portions engaging respective concave portions of the vibrating body; and
    pressurization means for applying pressure to the support member along a pressurization axis to maintain the vibrating body in pressure contact with the contact member so that during vibration of the vibrating body, the support member regulates movement of the vibrating body in directions other than a direction of the pressurization axis.

3. A piezoelectric motor comprising:
    a vibrating body for undergoing vibrational movement in accordance with a vibration wave, the vibrating body having a plurality of convex portions;
    a contact member disposed in contact with and driven by the vibrating body during vibration thereof;
    a support member supporting the vibrating body in the vicinity of a vibration node of the vibration wave, the support member having a plurality of concave portions engaging respective convex portions of the vibrating body; and
    pressurization means for applying pressure to the support member along a pressurization axis to maintain the vibrating body in pressure contact with the contact member so that during vibration of the vibrating body, the support member regulates movement of the vibrating body in directions other than a direction of the pressurization axis.

4. A piezoelectric motor according to claim 1; further comprising at least one friction member connected to the vibrating body for vibration therewith and having a portion extending from the vibrating body; and wherein the contact member is disposed in contact with and driven by the friction member during vibration thereof.

5. A piezoelectric motor according to claim 1; further comprising a guide member for guiding the support member along the pressurization axis.

6. A piezoelectric motor according to claim 1; further comprising a guide member for guiding the support member along the pressurization axis, and at least one friction member connected to the vibrating body for vibration therewith, the contact member being disposed in contact with and driven by the friction member during vibration thereof; and wherein the pressurization means comprises a spring member for biasing the support member along the pressurization axis and for restraining rotation of the vibrating body in the direction of rotation about the pressurization axis.

7. A piezoelectric motor according to claim 1; further comprising a guide member engaging an engagement portion of the support member for guiding the support member along the pressurization axis; and at least one friction member connected to the vibrating body for vibration therewith, the contact member being disposed in contact with and driven by the friction member during vibration thereof.

8. A piezoelectric motor according to claim 7; wherein the guide member is disposed in the vicinity of a vibration node of the vibration wave.

9. A piezoelectric motor according to claim 1; wherein the vibrating body has extension portions extending from side portions of the vibrating body; and wherein the support member engages the extension portions of the vibrating body.

10. A piezoelectric motor according to claim 1; further comprising a plurality of friction members connected to the vibrating body for vibration therewith, the contact member being disposed in contact with and driven by the friction members during vibration thereof; wherein the pressurization means includes means for applying pressure to the support member so that a contact pressure between the friction members and the contact member acts on plural points in a width direction of the vibrating body; and wherein each of the friction members is curved along a curved line extending in the width direction of the vibrating body.

11. A piezoelectric motor according to claim 1; wherein the contact member comprises a movable body, and the pressurization means comprises a spring member for applying a pressurization force to bias the support member along the pressurization axis to bring the movable body into pressure contact with the movable body; and wherein vibrating body is supported for undergoing rotation by a rotation shaft provided in the vibrating body.

12. A piezoelectric motor according to claim 11; wherein the spring member applies the pressurization force in the vicinity of a vibration node of the vibration wave.

13. A piezoelectric motor according to claim 11; wherein the pressurization force applied by the spring member generates a torque in the rotation shaft.

14. An electronic apparatus comprising: a piezoelectric motor according to claim 1, the contact member comprising a movable body driven by the vibrating body during vibration thereof to undergo movement; an output mechanism for undergoing operation in accordance with movement of the movable body; and a transmission mechanism for transmitting the movement of the movable body to the output mechanism.

15. An electronic apparatus comprising: a piezoelectric motor according to claim 7, the contact member comprising a movable body driven by the vibrating body during vibration thereof to undergo movement; an output mechanism for undergoing operation in accordance with movement of the movable body; and a transmission mechanism for transmitting the movement of the movable body to the output mechanism.

16. An electronic apparatus comprising: a piezoelectric motor according to claim 11, the contact member comprising a movable body driven by the vibrating body during vibration thereof to undergo movement; and output mechanism for undergoing operation in accordance with movement of the movable body; and a transmission mechanism for transmitting the movement of the movable body to the output mechanism.

17. A stage comprising: a piezoelectric motor according to claim 1, the contact member comprising a movable body driven by the vibrating body during vibration thereof to undergo movement; an output mechanism for undergoing operation in accordance with movement of the movable body; and a transmission mechanism for transmitting the movement of the movable body to the output mechanism.

18. A stage comprising: a piezoelectric motor according to claim 7, the contact member comprising a movable body driven by the vibrating body during vibration thereof to undergo movement; an output mechanism for undergoing operation in accordance with movement of the movable body; and a transmission mechanism for transmitting the movement of the movable body to the output mechanism.

19. A stage comprising: a piezoelectric motor according to claim 11, the contact member comprising a movable body driven by the vibrating body during vibration thereof to undergo movement; an output mechanism for undergoing operation in accordance with movement of the movable body; and a transmission mechanism for transmitting the movement of the movable body to the output mechanism.

20. A piezoelectric motor according to claim 1; further comprising a piezoelectric element disposed on the vibrating body for generating a vibration wave to vibrate the vibrating body.

21. A piezoelectric motor comprising:
a vibrating body having one of a plurality of concave portions and a plurality of convex portions;
a piezoelectric element disposed on the vibrating body for generating a vibration wave to vibrate the vibrating body;
a movable body disposed in contact with and driven by the vibrating body during vibration thereof;
a support member supporting the vibrating body in the vicinity of a vibration node of the vibration wave, the support member having the other of the plurality of concave portions and a plurality of convex portions engaging the corresponding respective concave or convex portions of the vibrating body; and
pressurization means for applying pressure to the support member to maintain the vibrating body in pressure contact with the movable body to thereby move the movable body during vibration of the vibrating body.

22. A piezoelectric motor according to claim 21; further comprising a plurality of friction members connected to the vibrating body for vibration therewith; and wherein the movable body is disposed in contact with the frictions members and is driven by the friction members during vibration thereof to undergo movement.

* * * * *